United States Patent
Manders et al.

(10) Patent No.: US 6,942,284 B2
(45) Date of Patent: Sep. 13, 2005

(54) OPEN ROOF ASSEMBLY FOR A VEHICLE, AND FRAME PART FOR APPLICATION THEREIN

(75) Inventors: Peter Christiaan Leonardus Johannes Manders, SM Horst (NL); Christiaan De Jong, EX Zwolle (NL)

(73) Assignee: Inalfa Roof Systems Group B. V., Venray (NL)

( * ) Notice: Subject to any disclaimer, the term of this patent is extended or adjusted under 35 U.S.C. 154(b) by 0 days.

(21) Appl. No.: 10/767,662

(22) Filed: Jan. 29, 2004

(65) Prior Publication Data

US 2004/0183341 A1 Sep. 23, 2004

(30) Foreign Application Priority Data

Jan. 30, 2003 (DE) .......................................... 103 03 770

(51) Int. Cl.[7] .................................................. B60J 7/00
(52) U.S. Cl. .................................. 296/213; 296/216.08
(58) Field of Search ................ 296/213, 216.07–216.08

(56) References Cited

U.S. PATENT DOCUMENTS

| | | | | | |
|---|---|---|---|---|---|
| 2,122,712 A | * | 7/1938 | Bishop | .................. | 296/220.01 |
| 3,016,263 A | * | 1/1962 | Rehmann | ............... | 296/216.04 |
| 4,332,416 A | * | 6/1982 | Lutz et al. | .................. | 296/213 |
| 4,883,311 A | * | 11/1989 | Kohlpaintner et al. | ...... | 296/213 |
| 4,969,681 A | * | 11/1990 | Schleicher et al. | ......... | 296/223 |
| 5,599,059 A | | 2/1997 | Shann | | |
| 6,786,537 B2 | * | 9/2004 | Allan et al. | ................. | 296/213 |
| 6,832,811 B2 | | 12/2004 | Nabuurs | ................ | 296/216.08 |
| 2002/0167201 A1 | * | 11/2002 | Niebuhr et al. | ............. | 296/213 |

FOREIGN PATENT DOCUMENTS

| | | |
|---|---|---|
| DE | 42 30 406 A | 3/1993 |
| DE | 101 16 456 A1 | 10/2002 |
| DE | 101 35 406 A1 | 2/2003 |
| DE | 201 21 555 U1 | 2/2003 |
| FR | 2 768 197 A | 3/1999 |
| GB | 325 897 A | 3/1930 |

* cited by examiner

Primary Examiner—Dennis H. Pedder
(74) Attorney, Agent, or Firm—Westman, Champlin & Kelly, P.A.; Linda P. Ji

(57) ABSTRACT

An open roof assembly for a vehicle having a roof opening and a closure mechanism. The roof opening is surrounded by a frame connected to the roof of the vehicle, including at least two guides extending along opposite longitudinal edges of the roof opening for cooperation with the closure mechanism, and drain channels extending substantially along all edges of the roof opening. The drain channels are integrally combined into one single frame part. The frame part includes receiving recesses for housing the two guides.

13 Claims, 2 Drawing Sheets

OPEN ROOF ASSEMBLY FOR A VEHICLE, AND FRAME PART FOR APPLICATION THEREIN

BACKGROUND OF THE INVENTION

The invention relates to an open roof assembly for a vehicle. More particularly, the present invention relates to an open roof assembly comprising a roof opening provided in the roof of the vehicle and a closure mechanism movable relative to the roof opening for opening and closing the latter. The roof opening is surrounded by a frame connected to the roof of the vehicle, which frame at least comprises two guides extending along opposite longitudinal edges of the roof opening for cooperation with the closure mechanism, and drain channels extending substantially along all edges of the roof opening.

The frame of such an open roof assembly comprises several parts, such as the two guides and the drain channels. During assembly of the open roof assembly, these parts are joined to create the frame that has to be connected to the roof of the vehicle. In corner areas of the frame preferably plastic materials are used, which should have specific adhesive properties, thus decreasing the choice of plastic materials to form such components. Further, due to the ever increasing complexity of open roof assemblies of the type referred to above, the demands on the parts of such an open roof assembly, especially the frame parts, will increase. Finally, while joining the separate parts of the frame special care should be taken for obtaining a proper sealing between the parts.

SUMMARY OF THE INVENTION

It is an object of the present invention to provide an improved open roof assembly of the type referred to above.

Thus, in accordance with one aspect of the present invention there is provided an open roof assembly for a vehicle, comprising a roof opening provided in the roof of the vehicle and a closure mechanism movable relative to the roof opening for opening and closing the latter, wherein the roof opening is surrounded by a frame connected to the roof of the vehicle, which frame at least comprises two guides extending along opposite longitudinal edges of the roof opening for cooperation with the closure mechanism, and drain channels extending substantially along all edges of the roof opening, wherein the drain channels are integrally combined into one single frame part, and wherein said frame part comprises receiving recesses for housing the two guides.

Because the drain channels are integrally combined into one single frame part the problems originating from joining separate parts are greatly eliminated. Such a single frame part, which substantially is constituted by the drain channels, is self-supporting. During assembly of the open roof assembly, only the guides should be inserted into the receiving recesses. An additional advantage is provided in that the guides will be positioned in a dry region of the open roof assembly.

In one embodiment, the receiving recesses of the frame part are shaped as gutters engaging the guides substantially at the bottom side and at the two lateral sides.

As a result the gutters substantially surround the guides, especially at the lower part thereof, such that separate sealing mechanisms between the guides and the frame part are not necessary. Moreover an effective connection between the guides and the frame part is realized. As a result, the guides obtain a stable position on the frame part.

Further it is possible, that the drain channels, extending along the transversal edges of the roof opening, bridge the gutters and the guides received therein.

The transversally extending drain channels (forward drain channel and rearward drain channel) not only bridge the guides received in the gutters, but also prevent these from moving upwards out of the receiving recesses (gutters). Thus, the bridging parts of the transversally extending drain channels define a fail-safe feature, which comes into effect when the connection between the guides and the gutters should fail.

Further, preferably the receiving recesses and guides are provided with cooperating fixing mechanisms for detachably connecting the guides to the recesses. Such cooperating fixing mechanisms could, for example, comprise snap mechanisms known per se.

In a further embodiment, the frame part comprises provisions for a connection thereof to the roof of the vehicle. Such provisions could comprise extensions of the frame part provided with holes for receiving screws, bolts or alike for a connection to the roof of the vehicle. However, the frame part also can include provisions for a connection thereto of other parts belonging to the open roof assembly, such as for example a sun screen assembly, a driving assembly or a control unit.

In still a further embodiment, of the open roof assembly according to the invention the frame part is provided with a cover or covers for covering selected areas of the frame part such as, for example, channels for driving cables or alike.

Often an open roof assembly of the type referred to above includes channels for driving cables for driving the closure mechanism. The cover or covers then could cover such channels. However, also other parts of the frame part could be covered by such cover or covers.

A second aspect of the present invention relates to a frame part for application in an open roof assembly according to the present invention.

BRIEF DESCRIPTION OF THE DRAWINGS

Hereinafter the invention will be elucidated referring to the drawings, in which an embodiment of the open roof assembly according to the invention is illustrated.

DETAILED DESCRIPTION OF THE ILLUSTRATIVE EMBODIMENT

Figure 3:
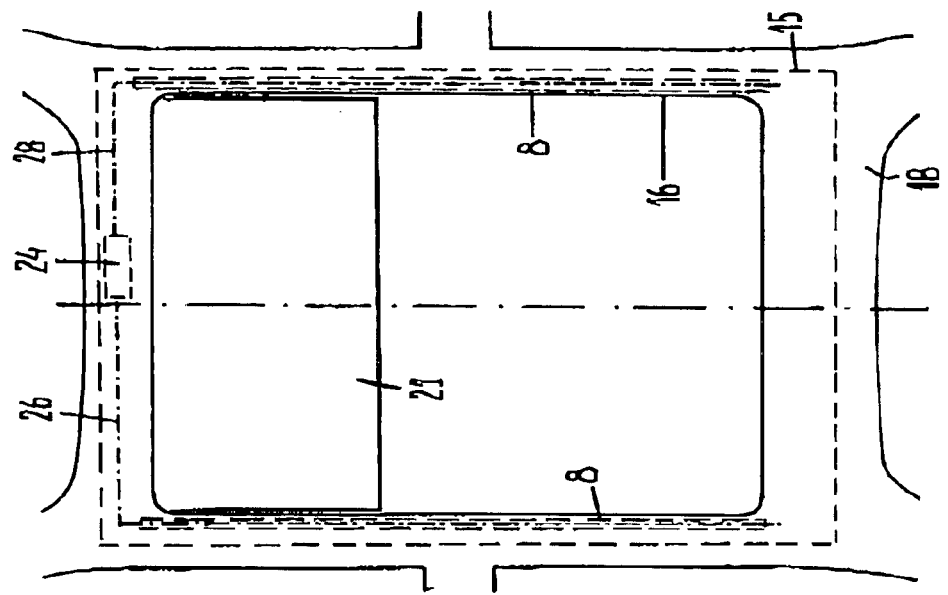
FIG. 3 is a schematic top plan view of a roof assembly.

Referring firstly to FIG. 3, a frame 15 is illustrated for surrounding a roof opening 16 provided in a roof 18 of a vehicle. The frame 15 forms part of a roof assembly, which further includes a closure mechanism having a closure element 21 for selectively closing or at least partially releasing the roof opening 16. The closure element 21 may be a rigid panel, in particular a transparent panel of glass or plastic material, but may also be constructed as slats, a flexible cover or the like.

In order to enable the movements of panel 21, panel 21 engages suitable guide rails 8 with its lateral ends, as is well known. The movement of the panel 21 relative to the guide rails 8 is effected by driving means such as an electric motor or a hand crank 24, the rotation of which is converted into a sliding movement and transmitted to driving cables 26, 28 directly or indirectly connected to the panel 21.

Figure 1:
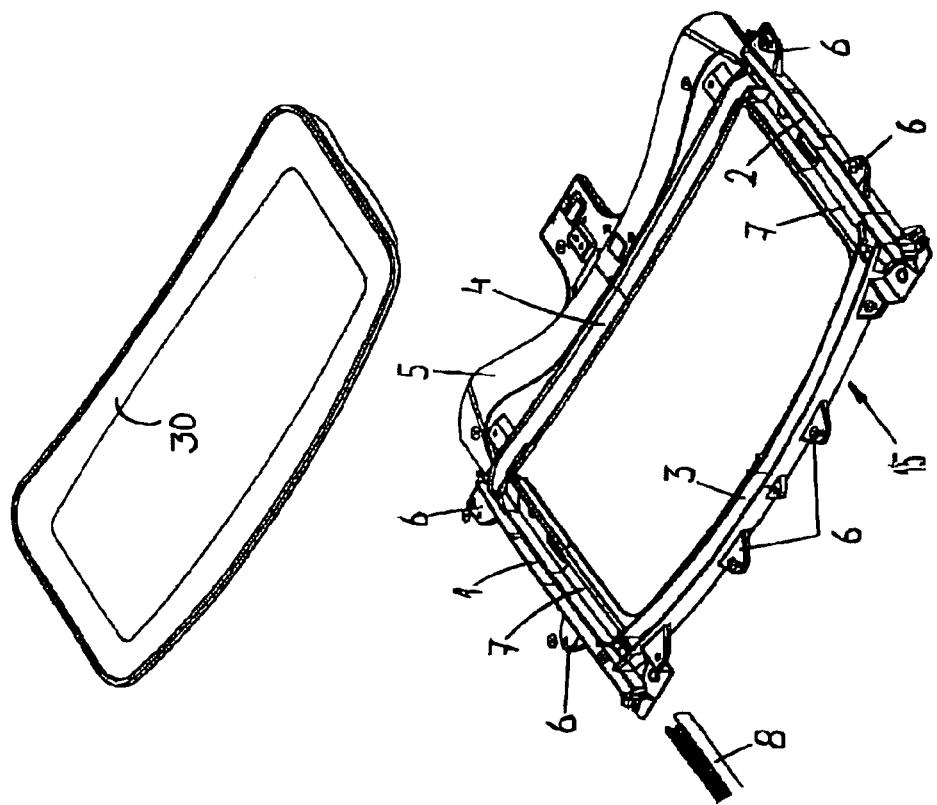
FIG. 1 shows perspectively a frame part for application in an open roof assembly according to the invention, partly disassembled.

Referring to FIG. 1, the frame basically includes two drain channels 1, 2 extending longitudinally (i.e. lengthwise relative to the vehicle represented by roof 18). Further, the frame includes a forward drain channel 3 and a rearward drain channel 4 extending transversally to drain channels 1 and 2. When the fame, as is known per se, has been mounted around the roof opening 16 of the vehicle, said drain channels 1–4 are positioned along the corresponding edges of the roof opening 16 for collecting water (e.g. rain water) entering the roof opening 16.

Further, near to its rearward drain channel 4, the frame is provided with mounting mechanism or flange 5 for a winding mechanism for a sunscreen (not shown in detail) or other parts. Such a winding mechanism or other parts are known per se, and their details are not relevant for the present invention.

Figure 2:
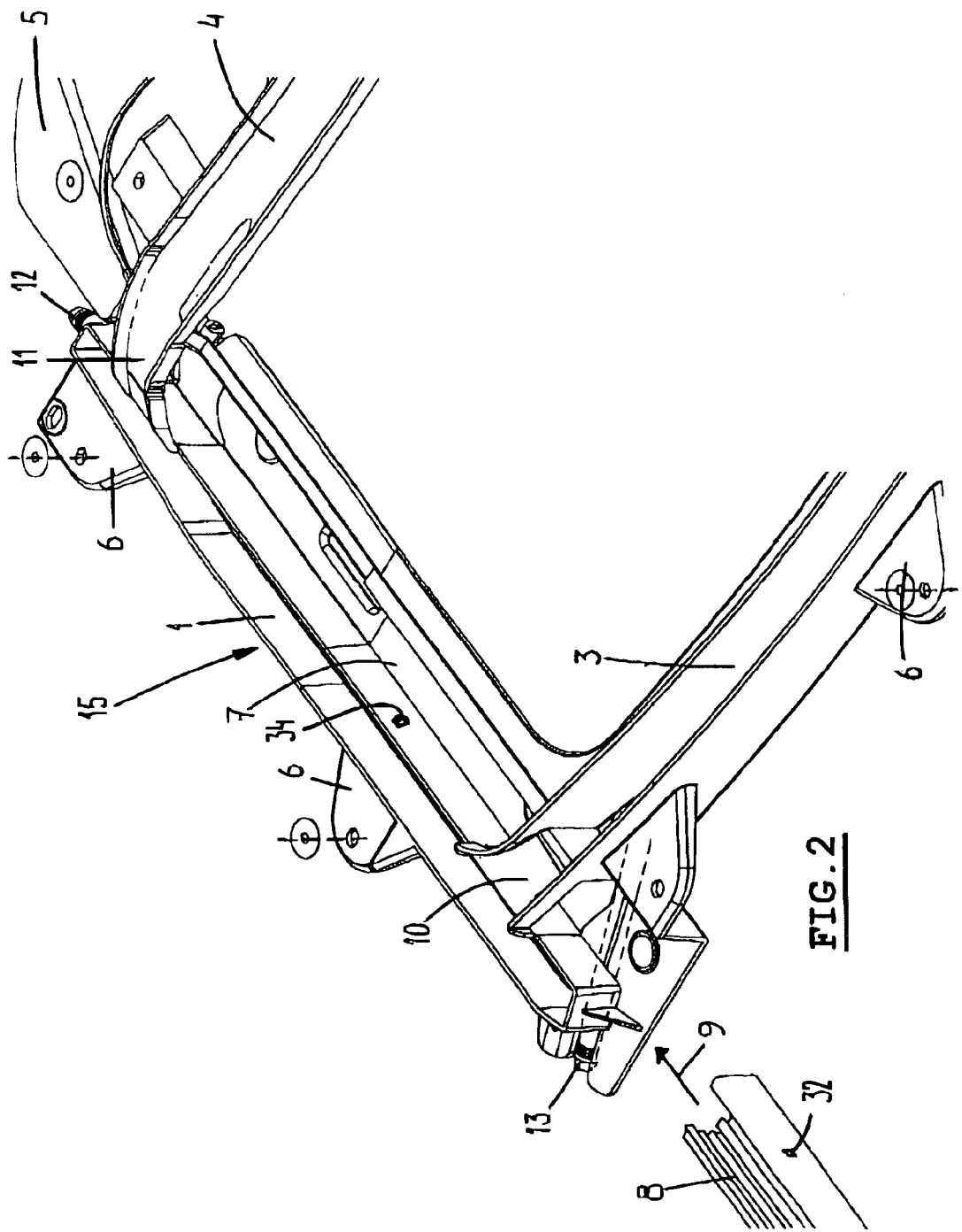
FIG. 2 shows, on a larger scale, a detail of the frame part illustrated in FIG. 1.

The frame as illustrated in FIG. 1 and FIG. 2 further comprises at least two guides extending along the opposite longitudinal drain channels 1, 2 (and thus along opposite longitudinal edges of the roof opening not shown) for cooperation with the closure mechanism, as is known per se. In FIG. 1 and FIG. 2 the guides 8 are not yet present in the frame 15, but will be applied in a manner to be described below.

Finally, the frame 15 is provided with provisions 6 for a connection thereof to the stationary roof part of the vehicle. Such provisions may, for example, comprise extensions of the frame body provided with holes for receiving screws or bolts to be attached to the stationary roof part of the vehicle. However, also other S appropriate mechanisms such as snaps for obtaining a connection between the frame 15 and the stationary part of the roof of the vehicle may be applied.

The longitudinal drain channels 1, 2 and forward drain channel 3 as well as rearward drain channel 4 are integrally combined into one single frame part formed as or from a single unitary body. Thus, the frame 15 already obtains its structural integrity by means of said drain channels.

Now reference is made to FIG. 2 which shows, on a larger scale, a detail of the frame illustrated in FIG. 1. FIG. 2 shows one longitudinal drain channel 1, the forward drain channel 3 and rearward drain channel 4. Further, part of the mounting mechanism 5 for a sunscreen or other part and some of the provisions 6 for obtaining a connection with a stationary part of the vehicle, are illustrated.

The frame part includes gutters 7, which define receiving recesses for housing guides. One such guide is illustrated at 8, and can be slid into the gutters 7 as indicated by arrow 9. These guides 8 cooperate with corresponding slide shoes or alike of the closure mechanism for closing and opening a roof opening 16 which is surrounded by the frame 15.

The gutters 7 are shaped such that they engage the guides 8 (when applied in the gutters) substantially at the bottom side and at the two lateral sides. As a result a stable positioning of the guides 8 within the gutters 7 is obtained. Further, the gutters or receiving recesses 7 and guides 8 may be provided with cooperating fixing mechanisms herein illustrated as one or more snap connections formed between the part 15 and the guide rail 8. In the embodiment illustrated, projections 34 are provided on the frame part 15, while corresponding recesses 32 for receiving the projections 34 are provided on the guide rail 8. It should be noted the position of projection 34 illustrated co-operates with a recess not shown, while the recess 32 illustrated co-operates with a projection not shown. As appreciated by those skilled in the art, the projections can be disposed on the guide rail 8, with the recesses formed on the frame part 15. Likewise, other fixing mechanisms such as fasteners or the like for detachably connecting the guides 8 to the recesses 7 can be used.

As mentioned before, the longitudinal drain channels 1,2 and forward and rearward drain channels 3 and 4, respectively, are integrally combined into one single frame part. Because, however, the guides 8 have to be slid longitudinally into the gutters 7, the forward drain channel 3 and rearward drain channel 4 bridge the gutters 7 (and the guides 8 received therein). Bridging sections 10 and 11 of the forward drain channel 3 and rearward drain channel 4, respectively, are indicated in FIG. 2. These bridging sections 10,11 also assist in maintaining the guides 8 at the desired location within the gutters 7.

When comparing the forward drain channel 3 with the rearward drain channel 4, it appears that the forward drain channel 3 is deeper than the rearward drain channel 4. This is because the rearward drain channel 4 should leave enough space for the passage of a sunscreen.

Rearward drain tubes 12 directly connect to the longitudinal drain channel 1, 2. Forward drain tubes 13 directly connect to the forward drain channel 3. Water entering the rearward drain channel 4 flows over the bridging sections 11 thereof into the longitudinal drain channels 1, 2. Water entering the forward drain channel 3 will not pass the bridging sections 10 (because these are elevated relative to the remainder of the bottom of the forward drain channel 3) and will leave the frame through the forward drain tubes 13.

FIG. 1 illustrates that the frame part 15 may be provided with a cover or covers 30 for covering selected areas of the frame part 15 (illustrated in a spaced apart or detached position), such as for example channels for driving cables or alike. Such channels could be provided within the guides 8 or within the frame itself.

The invention is not limited to the embodiment described before which may be varied widely within the scope of the invention as defined by the claims.

What is claimed is:

1. An open roof assembly for a vehicle having a roof opening provided in a roof of the vehicle, the roof assembly comprising a frame part connectable to the roof of the vehicle, wherein the frame part comprises:

longitudinal and transverse drain channels adapted to extend substantially along edges of the roof opening, wherein the longitudinal and transverse drain channels are integrally constructed;

receiving recesses extending along opposite longitudinal edges of the roof opening; and two guides, wherein a guide is disposed in one of the recesses and extends beyond portions of the transverse drain channels.

2. The open roof assembly according to claim 1, wherein the recesses of the frame part are shaped as gutters for engaging corresponding guides substantially at a bottom side and at substantially all of two lateral side surfaces of the corresponding guide.

3. The open roof assembly according to claim 2, wherein the transverse drain channels comprises bridging portions that are adapted to prevent the guides from moving upwards out of the gutters.

4. The open roof assembly according to claim 1, wherein the receiving recesses and guides are provided with co-operating fixing mechanism for detachably connecting the guides to the recesses.

5. The open roof assembly according to claim 1, wherein the frame part is adapted to connect to the roof of the vehicle.

6. The open roof assembly according to claim 1, wherein the frame part is provided with a cover for covering selected areas of the frame part.

7. A frame part for application in an open roof assembly, the frame part comprising:

longitudinal and transverse drain channels adapted to extend substantially along edges of the roof opening, wherein the longitudinal and transverse drain channels are integrally combined wherein said frame part defines receiving recesses, wherein each receiving recess is adapted for housing a guide, and wherein the transverse drain channels each comprise two bridging sections that connect to opposite longitudinal drain channels.

8. The frame part according to claim 7, wherein each receiving recess of the frame part is shaped as a gutter for engaging a corresponding guide substantially at a bottom side and at substantially all of two lateral side surfaces of the corresponding guide.

9. The frame part according to claim 8, wherein the transverse drain channels comprise a forward drain channel and a rearward drain channel that extend transversally to the guides and bridge the gutters and the guides received therein.

10. The frame part according to claim 7, wherein the frame part is adapted for connecting to the roof of the vehicle.

11. The frame part according to claim 7, wherein the frame part is provided with a cover for covering selected areas of the frame part.

12. An open roof assembly for a vehicle having a roof opening provided in a roof of the vehicle, the roof assembly comprising a frame part connectable to the roof of the vehicle, wherein the frame part comprises:

longitudinal and transverse drain channels adapted to extend substantially along edges of the roof opening, wherein the longitudinal and transverse drain channels are integrally constructed;

recesses extending along opposite longitudinal edges of the roof opening, wherein the transverse drain channels comprise bridge portions that bridge the recesses and connect to the longitudinal drain channels; and two guides, wherein one of the guides is disposed in each of the recesses.

13. An open roof assembly for a vehicle having a roof opening provided in a roof of the vehicle, the roof assembly comprising a frame part connectable to the roof of the vehicle, wherein the frame part comprises:

longitudinal and transverse drain channels adapted to extend substantially along edges of the roof opening, wherein the longitudinal and transverse drain channels are integrally constructed;

recesses extending along opposite longitudinal edges of the roof opening, wherein the recesses comprise substantially vertical side surfaces; and two guides, wherein one of the guides is disposed in each of the recesses, and wherein each or the guides comprise side surfaces that engage the vertical side surfaces of the recesses.

* * * * *